Patented Sept. 19, 1933

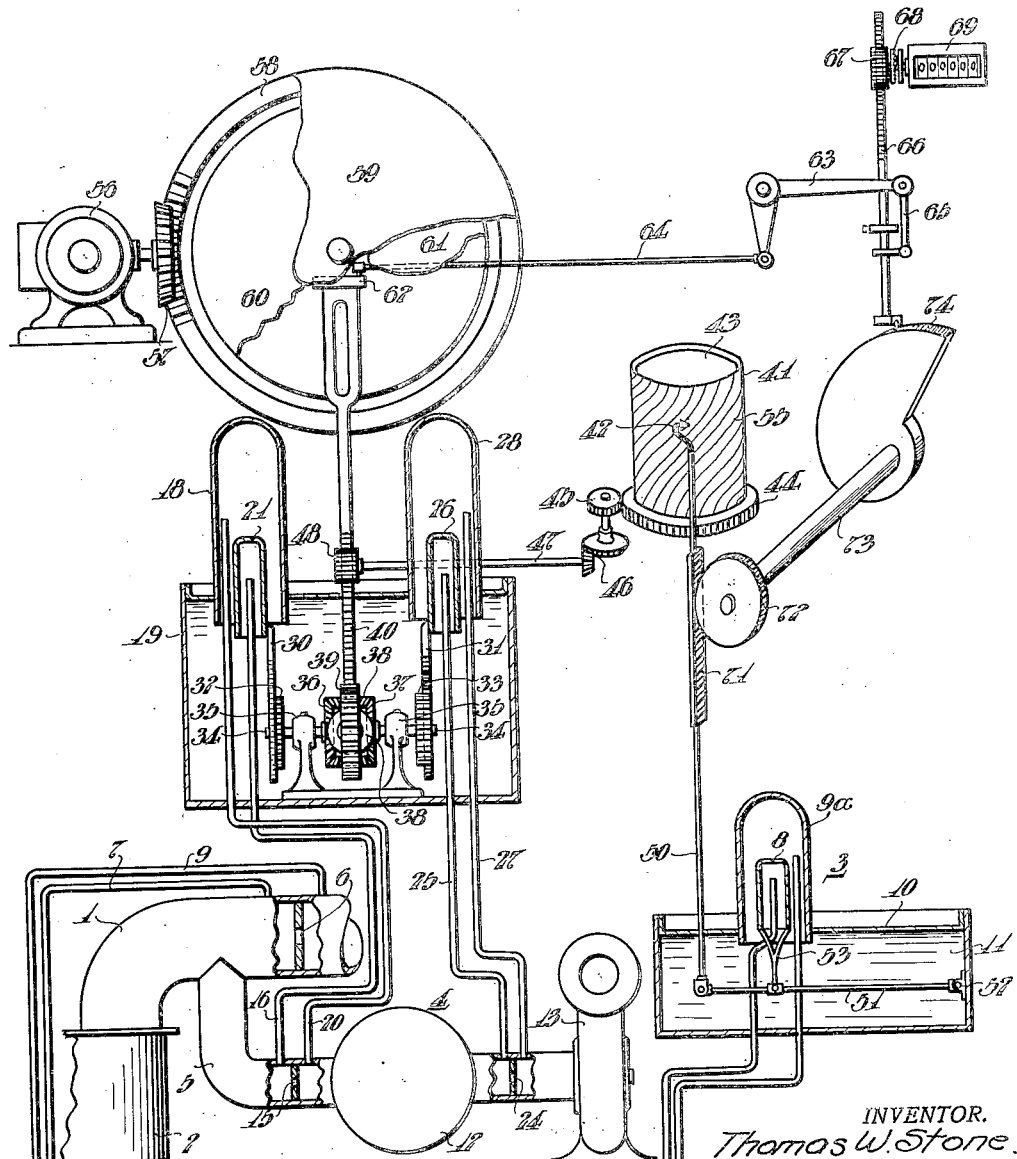

1,927,577

UNITED STATES PATENT OFFICE 1,927,577

FLUID MEASURING APPARATUS

Thomas W. Stone, Fort Wayne, Ind., assignor to The Western Gas Construction Company, a corporation of Indiana Application January 31, 1931. Serial No. 512,656

10 Claims. (Cl. 235—61)

This invention relates to fluid measuring apparatus, and while the invention has general application to this broader class of invention, the preferred embodiment disclosed herein is particularly suitable as an indicating and integrating device for crude gas meters.

In my copending application Serial No. 200,254, filed June 20, 1927, for a method of and apparatus for measuring gases, the claimed disclosure comprises in general the measurement of raw gas, the sampling of the gas being measured, and the correcting of the measurement of the raw gas in proportion to the measurements obtained by the sampling operation.

In the copending application of Maurice B. Zoll, Serial No. 425,180, filed Feb. 1, 1930, for a method and apparatus for measuring gases, the claimed disclosure includes a method of and apparatus for integrating the results of the various readings obtained according to my copending application.

The present invention also involves the broader method and apparatus of my copending application, and may be considered as an improvement upon the copending Zoll application in that it provides an improved apparatus for substantially the same purpose.

It is therefore an object of the present invention to economize and improve the construction and operation of devices of this character, to render them simple and convenient in use, and otherwise well adapted for the purposes set forth.

Other objects and features of novelty will be apparent as the following description proceeds, reference being had to the accompanying drawing, in which The single figure is a somewhat diagrammatic view, partly in section and partly in perspective, showing the indicating and integrating device according to the preferred embodiment of the present invention as connected to a dilute gas conduit and including the sampling device.

Referring more particularly to the drawing, the dilute fluid to be measured is passed through a conduit 1, and in the preferred embodiment shown, the fluid is crude or raw gas, such as water gas, coke-oven gas or producer gas, which is supplied from a tar batter or wash-box 2. A fluid measuring device 3 is installed in the conduit 1, and a sampling device 4 is associated with the conduit 1 for taking off a sample of the gas being measured. The sampling device 4 is located in a branch 5, preferably a by-pass associated with the conduit 1.

The fluid-measuring device 3 for measuring raw gas comprises a flow meter preferably of the orifice type, and an orifice 6 is accordingly installed in the conduit 1. A pipe 7 connects the high-pressure side of the orifice 6 with the interior of a float 8, while a pipe 9 connects the low-pressure side of the orifice 6 with the interior of a bell 9a mounted in a receptacle 10 containing a liquid 11 which has a buoyant effect upon the float 8 when gas is contained therein.

The sampling device 4 includes means for removing condensible vapors from the gas being measured and which in the form shown comprises a condenser 12. This condenser may be of the form shown in my copending application hereinbefore referred to, but it is not limited to the specific form shown therein, as it may employ water or other condensing fluid, whether of jet or surface type, or may be an entirely different structure for removing water vapor or other diluent material.

The condenser 12 is preferably designed to reduce the gas to standard conditions for the production of "corrected" gas. Such conditions are a temperature of 60° F. at a pressure of thirty inches of mercury.

A pump or blower 13 is associated with the branch or sampling conduit for the purpose of maintaining uniform flow through the same. In case the sampling device is located in a by-pass such as 5, the blower 13 will discharge into the conduit 1 beyond the orifice 6.

The sampling conduit which includes the condenser 12 is provided with means for measuring the sample before and after the operation of the condenser 12 thereon. In the form shown, an orifice 15 is mounted in the conduit ahead of the condenser 12, and a pipe 20 connects the low-pressure side of the orifice 15 with the interior of a bell 18 mounted in a receptacle 19.

The high-pressure side of the orifice 15 is connected by a pipe 16 with the interior of a float 21 mounted within the bell 18 and responsive to the buoyant effect of liquid contained in the receptacle 19. Beyond the condenser 12, the sampler conduit is provided with an orifice 24, the high-pressure side of which is connected by a pipe 25 with the interior of a float 26, while the low-pressure side is connected by a pipe 27 with the interior of a bell 28.

The orifices 6, 15, and 24, and associated bells 9a, 18 and 28, and floats 8, 21 and 26, respectively, constitute flow meters of the orifice type. The floats and bells are so designed that the floats do not rise or fall in direct proportion to the difference in pressure, but rather are so shaped that their rise and fall is proportional to the logarithm of the square root of the difference and hence directly proportional to the logarithm of the velocity of the gases passing through the respective orifices.

Means are provided for automatic differentiation of the results of the sampling device flow meters. In the form shown, the floats 21 and 26 respectively carry racks 30 and 31 meshing with gears 32 and 33 respectively carried by shafts 34 mounted in bearings 35 supported by the bottom of the receptacle 19. A bevel gear 36 is rigid with the gear 32 being keyed to the shaft thereof while a similar bevel gear 37 is rigid with the gear 33 in the same manner. Bevel pinions 38 meshing with both gears 36 and 37 are carried by internal studs of a ring gear 39 which meshes with a rack 40.

The bevel gearing just described constitutes a planetary differential gearing so that movement of the rack 40 is proportional to the differential effect of the two orifice meters.

There is a particular advantage in the structure just described, in that the liquid in the receptacle 19 may be lubricating oil so that the lubrication of the gearing is provided for and at the same time this oil will form the buoyant liquid for the action of the floats 21 and 26.

Means are provided for indicating the instantaneous corrected flow of the crude or raw gas passing through the conduit 1, which comprises essentially a chart 41 and an indicator 42. This indicator may be a stylus provided with ink, whereby the same may trace a permanent record on the chart 41. The chart 41 is mounted on a cylinder 43 provided with a gear 44 meshing with a pinion 45 connected by bevel gearing 46 with a shaft 47 carrying a pinion 48 which meshes with the rack 40. With this arrangement, the chart 41 is turned in proportion to the differential effect of the floats 21 and 26.

The stylus 42 is carried by a rod 50 pivoted to a lever 51, fulcrumed as at 52 inside the receptacle 10 and connected by a link 53 with the float 8. With this arrangement, the vertical movement of the stylus 42 is proportional to the flow through the orifice 6. The chart 41 being calibrated by diagonal lines 55, the position of the stylus 42 at any instant will give a direct reading of the flow through the orifice 6, corrected by the sampling device 4, and thus give a corrected reading of the true flow of gas in the conduit 1.

Means are provided for registering the total or integrated quantity of corrected gas that has passed through the conduit 1 since an initial or starting time. A constant-speed drive device which is illustrated as a motor 56, drives a bevel pinion 57 which meshes with both of two equally and oppositely disposed bevel gears 58 and 59. The inner face of the gear 58 carries a friction disc 60, while the inner face of the gear 59 carries a friction disc 61. Interposed between and contacting with both friction discs 60 and 61 is a friction-driven roller 62, which is pivoted on the upper end of the rack 40. With this arrangement, the speed of the roller 62 is proportional to the vertical position of the rack 40.

The roller 62 actuates a bell crank 63 through a pitman 64. The crank 63 is connected by a link 65 with a vertical rack 66 which, through a gear 67 and a ratchet 68, actuates a cumulative counter 69. Thus the number of reciprocations of the rack 66 is proportional to the differential effect of the floats 21 and 26.

Means are provided for limiting the travel of the rack 66 in proportion to the flow through the main orifice 6. Accordingly, the rod 50 is provided with a rack 71 which meshes with a gear 72 carried by a shaft 73. The shaft 73 also has keyed thereto a cam 74, the surface of which is spiral and calibrated in proportion to the flow through the main orifice 6.

Thus, when the flow through the main orifice 6 is low, the travel of the rack 66 will be correspondingly low and will require a greater number of reciprocations to actuate the counter 69 through the ratchet 68. The speed of reciprocation of the rack 66 being proportional to the differential effect of the orifices 15 and 24, and the travel of the reciprocations being proportional to the effect of the main orifice 6, the total indicated by the counter 69 is a corrected reading of the total quantity of true or corrected gas which has passed through the conduit 1 during a given run of the apparatus.

While an embodiment of the invention has been illustrated and described in such detail as to enable anyone skilled in the art to practice the invention, nevertheless it will be understood that the invention is not to be limited to any of the details disclosed, other than as necessitated by the development of the prior art; but instead it will be appreciated that the invention embraces such embodiments of the broad idea as fall within the scope of the appended claims, it being obvious that various changes may be resorted to with respect to the disclosed embodiment without departing from the spirit of the invention.

I claim as my invention:

1. In fluid-measuring apparatus, means for measuring dilute fluid passing through a conduit, means for sampling said dilute fluid including means for removing diluent and means for measuring the sample before and after removal, differential gearing associated with said sample measuring means, indicating means associated with said dilute fluid-measuring means, and means connecting said differential gearing and said indicating means for automatically correcting the reading thereof in proportion to the differential effect of said sample measuring means.

2. In fluid-measuring apparatus, a main flow meter, a by-pass, means in said by-pass for removing diluent from fluid passing therethrough, flow meters in said by-pass on each side of said means, differential gearing associated with said by-pass flow meters, indicating means associated with said main flow meter, and means connecting said differential gearing and said indicating means whereby the reading of the latter is automatically corrected in proportion to the differential effect of said by-pass flow meters.

3. In a fluid-measuring apparatus, a fluid sampling device including means for removing diluent from fluid passing therethrough, means for measuring the sample before and after removal, a constant-speed device and a change-speed mechanism driven thereby, and means responsive to the differential effect of said sample-measuring means for actuating said change-speed mechanism.

4. In a fluid-measuring apparatus, means for measuring dilute fluid passing through a conduit, means for sampling said dilute fluid including means for removing diluent from fluid passing therethrough, means for measuring the sample before and after removal, a constant-speed device and a change-speed mechanism driven thereby, means responsive to the differential effect of said sample measuring means for actuating said change-speed mechanism, an oscillating member driven by said change-speed mechanism, means for varying the extent of the oscillation thereof in proportion to the measurement of the dilute fluid, and a cumulative counter for indicating the total of said oscillations.

5. In fluid-measuring apparatus, means for measuring dilute fluid passing through a conduit, means for sampling said dilute fluid including means for removing diluent and means for measuring the sample before and after removal, mechanism controlled by said dilute fluid-measuring means and by the differential effect of said sample measuring means for indicating the instantaneous corrected measurement of the fluid, and interconnected mechanism for cumulatively registering the corrected total quantity thereof.

6. In fluid-measuring apparatus, a main flow meter including an orifice in a conduit containing the gas to be measured, a by-pass containing a condenser, flow meters including orifices in said by-pass above and below said condenser, each of said flow meters comprising a bell, a float within said bell, a liquid having a buoyant effect upon said float, a pipe connecting the upstream side of the orifice with the interior of the float, and a pipe connecting the downstream side with the interior of the bell, the floats of said by-pass flow meters having a common liquid, and differential gearing connecting said floats and immersed in said liquid.

7. In fluid-measuring apparatus, a main flow meter, a cam actuated by said main flow meter, a pair of sampling flow meters, differential gearing actuated by said sampling flow meters, a constant-speed drive device including a disc, a roller in contact with said disc and movable radially thereof by said gearing, mechanism driven by said roller including a reciprocating element, a ratchet, and a counter, and means carried by said reciprocating element and engaging said cam for limiting the travel of said reciprocating element.

8. In fluid-measuring apparatus, a main flow meter, a pointer actuated by said main flow meter, a pair of sampling flow meters, differential gearing actuated by said sampling flow meters, a chart cylinder actuated by said differential gearing, and a chart carried by said cylinder and co-operating with said pointer.

9. In a raw gas-measuring apparatus, means for measuring raw gas passing through a main, means for sampling said raw gas including means for removing diluent and means for measuring the sample before and after removal, differential gearing associated with said sample measuring means, indicating means associated with said raw gas measuring means, and means connecting said differential gearing and said indicating means for automatically correcting the reading thereof in proportion to the differential effect of said sample measuring means.

10. In a raw gas-measuring apparatus, a main flow meter, a by-pass, means in said by-pass for removing diluent, flow meters having orifices in said by-pass above and below said means, each of said by-pass flow meters comprising a bell, a float within said bell, a liquid having a buoyant effect upon said float, a pipe connecting the upstream side of the orifice with the interior of the float and a pipe connecting the downstream side with the interior of the bell, differential gearing connecting said floats, and interconnected means associated with said differential gearing and said main flow meter for combining the effects thereof, and indicating means responsive to said interconnected means.

THOMAS W. STONE.